United States Patent [19]
Milliman

[11] Patent Number: 5,795,392
[45] Date of Patent: Aug. 18, 1998

[54] CORE TUBE FOR A CROSS-HEAD DIE APPARATUS

[76] Inventor: James A. Milliman, 8644 Emerald Cir. South, Rome, N.Y. 13440

[21] Appl. No.: 819,576

[22] Filed: Mar. 14, 1997

[51] Int. Cl.$^6$ .............................. B05C 3/02; B05C 3/12
[52] U.S. Cl. ..................... 118/405; 425/113; 425/133.1; 425/192 R; 239/596
[58] Field of Search .................... 118/405, 410, 118/419, 420, DIG. 18, DIG. 19; 239/596; 425/113, 133.1, 192 R

[56] References Cited

U.S. PATENT DOCUMENTS

| | | | |
|---|---|---|---|
| 4,512,944 | 4/1985 | Astfalk et al. | 264/174 |
| 5,031,568 | 7/1991 | Milliman | 425/113 |
| 5,316,583 | 5/1994 | Milliman | 118/405 |
| 5,540,775 | 7/1996 | Milliman | 118/405 |
| 5,565,218 | 10/1996 | Brown et al. | 425/113 |
| 5,651,935 | 7/1997 | Matsukura et al. | 264/503 |
| 5,665,164 | 9/1997 | Milliman | 118/420 |

*Primary Examiner*—Donald E. Czaja
*Assistant Examiner*—Jacqueline A. Ruller
*Attorney, Agent, or Firm*—George R. McGuire

[57] ABSTRACT

A core tube or tip holder for positioning in the axial bore of the body of cross-head die apparatus through which a wire, or the like, is drawn as a layer of flowable coating material is applied thereto. The coating material is injected through a radial bore in the body which communicates with the axial bore at a position aligned with a first annular groove in the external surface of the core tube. The first annular groove extends between opposite ends partially around the core tube. A second annular groove extends fully around the core tube. The second annular groove is positioned between the first groove and the front end of the core tube. The first and second annular grooves communicate with one another via a pair of axial grooves extending between the second annular groove and the opposite ends of the first groove. The first annular groove and axial grooves are bounded on all sides by external surface portions which lie in a uniformly tapering, conical plane.

25 Claims, 3 Drawing Sheets

CORE TUBE FOR A CROSS-HEAD DIE APPARATUS

BACKGROUND OF THE INVENTION

The present invention relates to die apparatus of the cross-head type wherein a layer of flowable coating material is applied to a continuous, filamentary member as it is moved axially through the apparatus. More specifically, the invention is concerned with novel and improved configurations of an element of such apparatus known as a tip holder or core tube, the latter term being employed herein.

Reference is made to applicant's prior U.S. Pat. Nos. 5,031,568, 5,316,583 and 5,540,775 which disclose cross-head die apparatus incorporating a core tube which serves the dual purposes of positioning a tip in precise axial alignment with a die orifice and of providing a flow guide for the flowable coating material. The core tubes of these patents have in common a 360° annular groove encircling the longitudinal axis of the body of the apparatus and positioned inwardly of a radial bore in the body. Coating material injected through the radial bore flows around the annular groove in the core tube and thence forwardly through axial grooves and/or over an annular lip into and through a cavity defined by internal bore walls and the outer, forward surfaces of the core tube and the tip.

One of the most critical features of cross-head die apparatus is to provide uniform thickness of the coating material upon and concentricity with the coated member. Even and uniform flow of the coating material through the flow passages in the axial bore of the body to the die orifice is essential, and is highly influenced by the external configuration of the forward part of the core tube. Although the core tube configurations of the aforementioned patents provided improved flow characteristics as compared to prior art systems available at the time, coatings which were out of tolerance still occurred in some instances.

The principal object of the present invention is to provide a core tube for use in cross-head die apparatus having a forward portion of novel external configuration, resulting in consistent and improved coating performance.

Another object is to provide cross-head die apparatus having an internal flow cavity defined by spaced surfaces of an axial bore and a core tube to apply a coating of uniform thickness and concentricity to a filamentary member.

Other objects will in part be obvious and will in part appear hereinafter.

SUMMARY OF THE INVENTION

The arrangement of components and manner of operation of the cross-head die apparatus disclosed herein is basically the same as that of applicant's aforementioned patents. The configuration of the body portion, the tip and the die member, including internal bores, passageways and orifices, may correspond essentially to those of the referenced prior patents. The filamentary member to which the coating material is applied is drawn axially through the apparatus from rear to front, passing through and being guided by the central passageway extending through the tip and passing concentrically through the die member orifice. The flowable coating material, e.g., a suitable plastic heated to a temperature providing the desired viscosity, is injected through a radial bore in the body and flows through a passageway defined by internal walls of the body and die member, and external surface portions of the core tube and the tip, all as in the prior art.

The core tube of the present application has an external configuration differing from the corresponding prior art component to alter the flow path of the coating material. The outer surface of the core tube is generally frustoconical in shape and is in mating engagement with a correspondingly shaped portion of the axial bore in the body, with which the radial bore communicates. Preferably, one or more axial segments extending around the external surface of the core tube are recessed from the plane of mating engagement to reduce the area of surface contact, thereby facilitating removal of the core tube from the body axial bore in the manner of the die member of applicant's copending patent application No. 08/738,475, filed on Oct. 28, 1996.

A pair of annular grooves are formed in the external surface of the core tube. The first of these grooves extends partially around the periphery of the core tube and is positioned with its circumferential mid-point inwardly adjacent the position at which the radial bore in the body communicates with the axial bore. The first annular groove, which is otherwise of constant width is slightly enlarged by indentations on both axial sides of its circumferential mid-point.

The second annular groove extends fully around the core tube and is spaced axially forwardly of the first annular groove, both grooves concentrically surrounding the central axis of the core tube. The first groove communicates with the second via a pair of intermediate grooves extending from opposite ends of the first groove to the second groove, substantially parallel to the longitudinal axis of the tube. The outer surface of the core tube rearwardly of the second groove is in mating engagement with the body bore, preventing flow of the coating material out of the first groove other than through the pair of intermediate grooves, into the second annular groove.

The core tube includes a portion extending forwardly from the second annular groove, and having a frustoconical external surface tapering inwardly from rear to front at a greater angle than the other core tube external surface. The front of the second annular groove meets the forward portion of the core tube at an annular lip which is spaced concentrically inwardly a short distance from the wall of the axial bore in the body. Thus, the coating material may flow from the second annular groove over the full circumference of the lip and into the space defined by the body bore and the forward part of the core tube. Preferably, a pair of small axial grooves are formed on diametrically opposite sides of the lip, midway between the positions where the intermediate grooves communicate with the second annular groove.

The foregoing and other features of the invention will be more fully understood from the following detailed description, taken in conjunction with the accompanying drawings.

DETAILED DESCRIPTION

Figure 1:
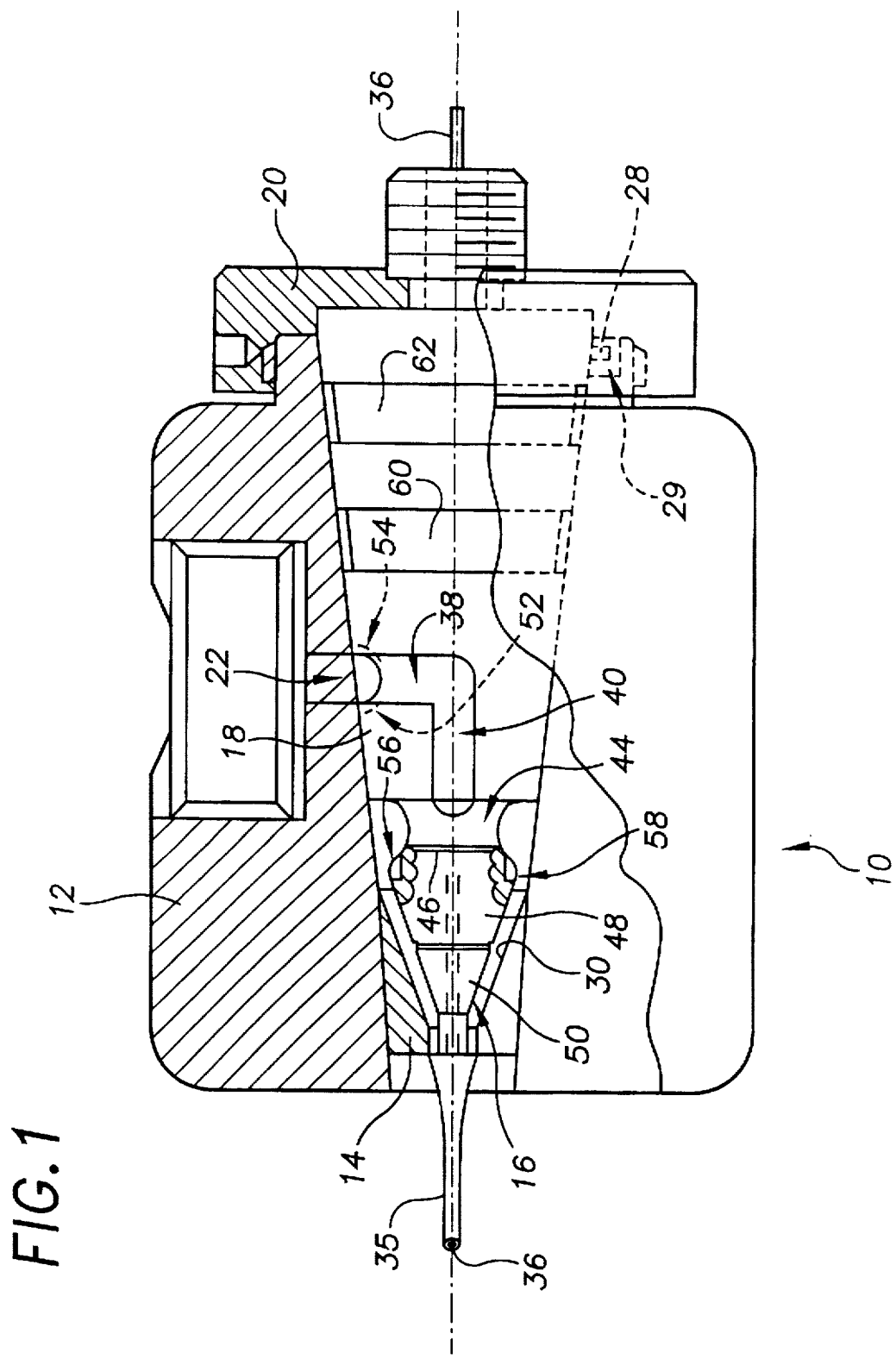
FIG. 1 is a side-elevational view, partly in section, of cross-head die apparatus incorporating the present invention.
Figure 2:
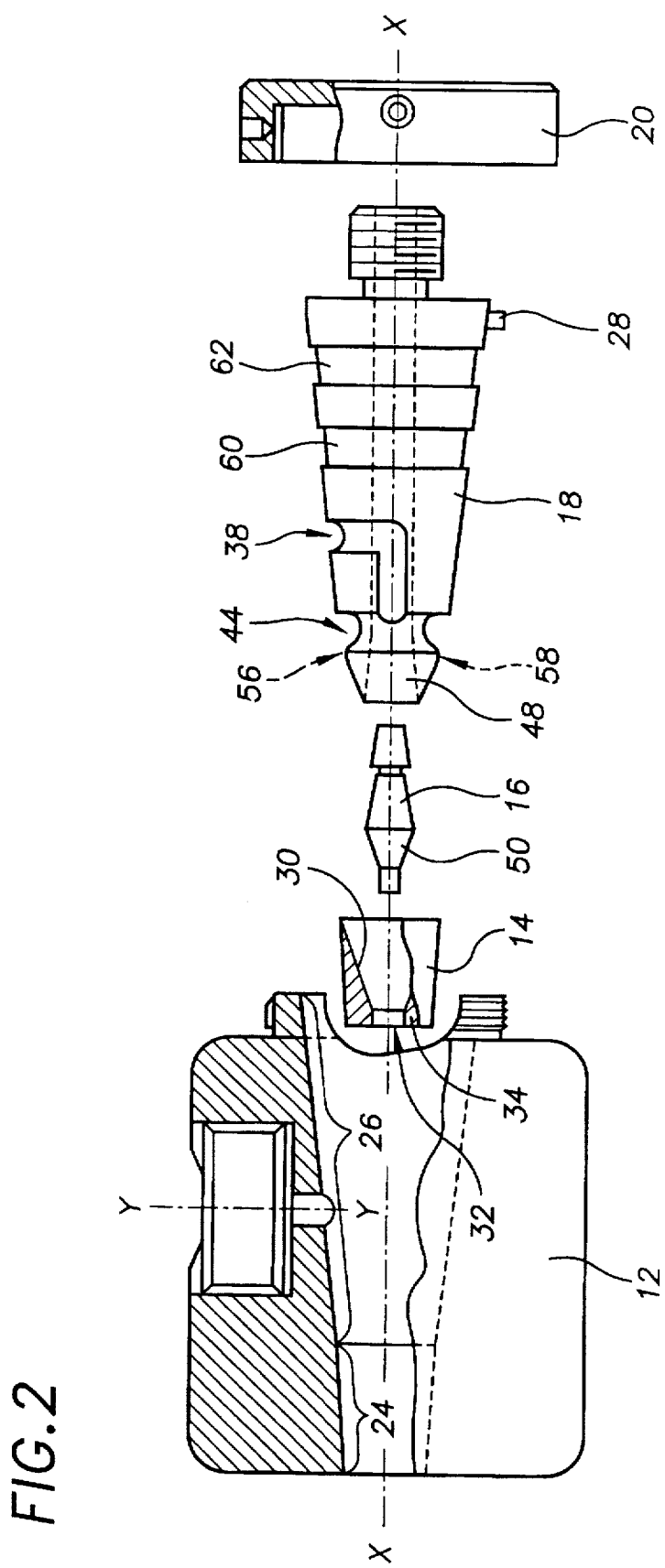
FIG. 2 is an exploded view, also in side elevation, of the cross-head die apparatus of FIG. 1.

Referring now to the drawings, cross-head die apparatus 10 incorporating the present invention is shown in fully assembled condition in FIG. 1, and with the component parts axially separated in FIG. 2. Components of apparatus 10 include body 12, die member 14, tip 16, core tube 18, and collar 20. Body 12 includes radial bore 22 having central axis Y—Y, and an axial bore defined by forward and rear surface portions 24 and 26, respectively, and having central axis X—X. The external surface of die member 14 matingly engages opposing portions of forward bore portion 24 when the components are assembled and operating. The rear portion of tip 16 fits within the forward portion of core tube 18, and conically tapered portions of the external surface of core tube 18 matingly engage rear surface portion 26 of the axial bore of body 12.

Molten plastic, rubber or other such coating material is injected into apparatus 10 through radial bore 22, flows around and through annular and axial grooves in core tube 18 as described hereinafter, and forwardly through the annular passage between the forward end of the core tube and surrounding surface portions of the axial bore of body 12. Dowel pin 28 extends radially from a rear portion of core tube 18 and fits within keyway 29 in a rear portion of body 10 when the elements are assembled to maintain a desired rotational orientation of the core tube and body. The portion of tip 16 extending forwardly of core tube 18 is surrounded, in spaced relation by internal, frustoconical surface 30 of die member 14. Die orifice 32 in front wall 34 of die member 14 communicates with the flow guide passageway formed by tip 16 and surface 30.

Filamentary member 36 is taken from a supply (not shown) rearwardly of apparatus 10 and passes through a guide passageway in tip 16 to exit the forward end of apparatus 10 through die orifice 32. The diameter of orifice 32 is larger by a predetermined amount than the diameter of member 36, whereby coating material also flows through orifice 32 to form an evenly distributed coating 35 on member 36. Reference may be had to the aforementioned patents for any other details of construction, assembly and operation of apparatus 10.

Figure 3:
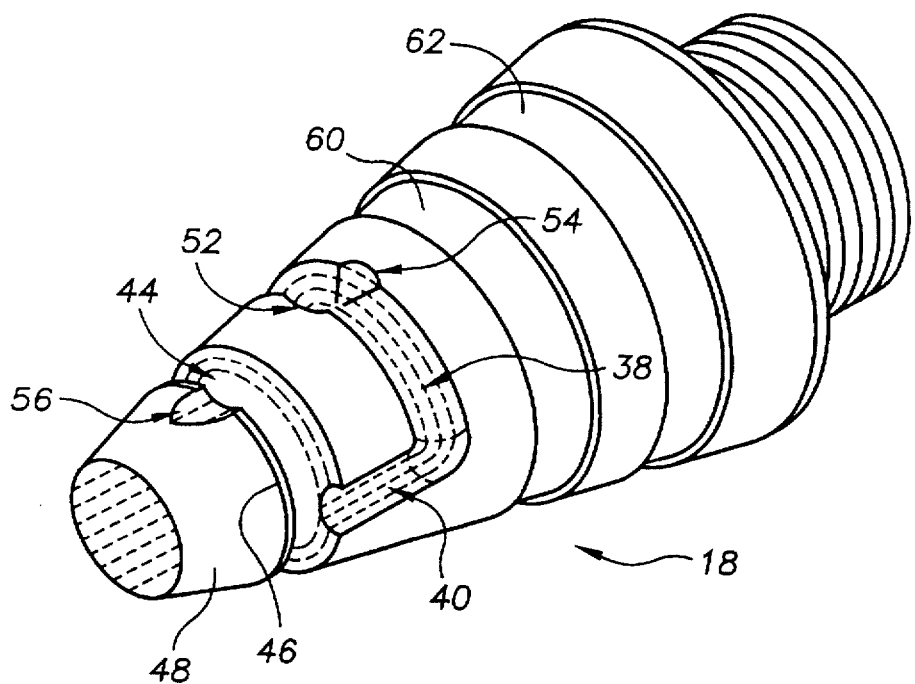
FIGS. 3 and 4 are front and rear perspective views, respectively, of the core tube element of the invention.
Figure 4:
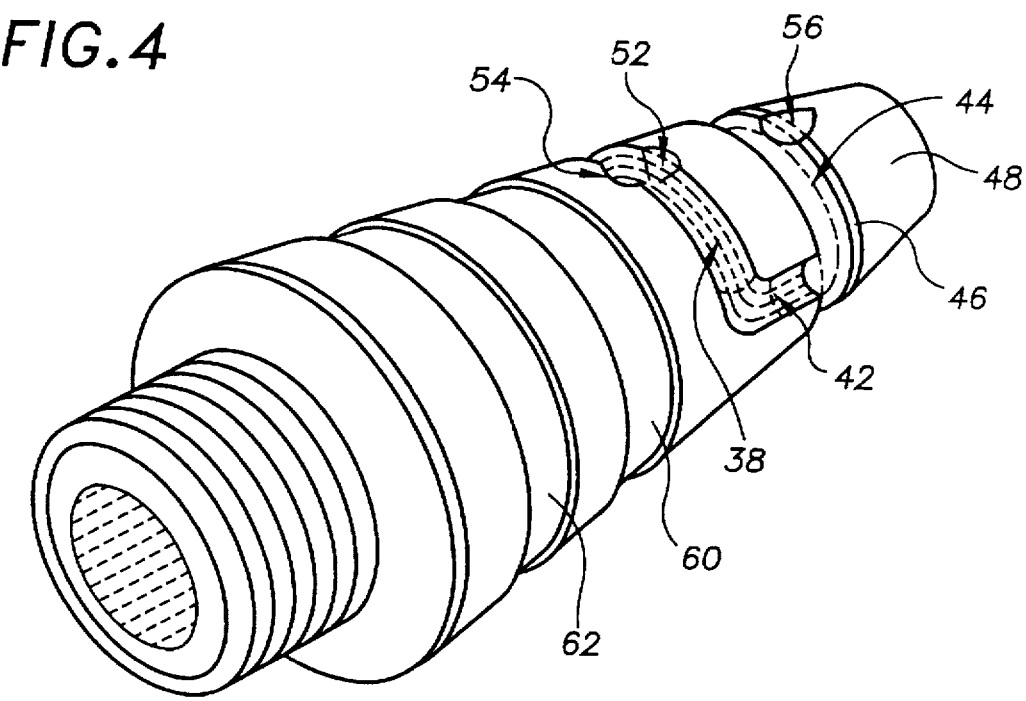

Core tube 18, with which the present invention is most directly concerned, is shown individually and in more detail in FIGS. 3 and 4. Annular groove 38 extends around a portion of the periphery of core tube 18 between opposite ends where it communicates with axial grooves 40 and 42, respectively. The rotational orientation of body 10 and core tube 18 is such that the mid-point between the ends of groove 38 is aligned with axis Y—Y of radial bore 22. A horizontal plane through axis X—X also intersects the axial centerlines of grooves 40 and 42.

The forward ends of grooves 40 and 42 communicate with annular groove 44, extending 360° around core tube 18. Exterior surface portions of core tube 18 by which grooves 38, 40 and 42 are bounded on all sides matingly engage parts of rear surface portion 26. Thus, annular groove 38 communicates with annular groove 44 only through axial grooves 40 and 42. At its forward end, annular groove 44 is bounded by lip 46 which has a circumference less than that of the surrounding portion of the body axial bore. That is, lip 46 is spaced from the internal surface of the bore, thereby allowing the coating material to flow from annular groove 44, over lip 46 and into the conical passageway defined by the external surfaces of forward portions 48 and 50 of core tube 18 and tip 16, respectively, and interior surface 30 of die member 12.

Annular groove 38 is widened slightly on both the front and rear sides of its mid-point in the areas indicated by reference numerals 52 and 54, respectively. Also, relatively small axial grooves 56 and 58 extend through lip 46 at positions 90° around annular groove 44 from the communications therewith of axial grooves 40 and 42. Although provision of areas 52 and 54, and axial grooves 56 and 58 is optional, their presence has been found to have a positive effect on the even and consistent distribution of coating material through the conical passageway communicating with die orifice 32. Thus, as filamentary member 36 exits the forward end of apparatus 10, it is surrounded by a layer of coating material of uniform thickness with a quality and consistency of operation superior to that of prior art apparatus of this type.

It will be noted that axial segments 60 and 62 of the external surface of core tube 18 are recessed from the forwardly and rearwardly adjacent portions which matingly engage rear surface portion 26 of the axial bore of body 10. This construction is preferred in order that less force be required to dislodge the core tube from the bore when the apparatus is disassembled for cleaning, inspection, repair, etc. It will be noted that the external surface portions of core tube 18 rearwardly of annular groove 44 which matingly engage surface portion 26 lie in a uniformly tapering, conical plane; lip 46 and all external surface portions forwardly of groove 44 lie entirely within this conical plane.

What is claimed is:

1. A core tube for use in cross-head die apparatus having a body with an axial bore through which a filamentary member is longitudinally moved for application thereto of a coating material, said body having a radial bore through which said coating material is injected into said axial bore, said core tube comprising:

a) a hollow member having a longitudinal axis, front and rear ends and an external surface with portions configured for mating engagement with opposing portions of said axial bore;

b) a first annular groove extending between opposite ends partially around said external surface;

c) a second annular groove extending 360° around said external surface at a position between said first annular groove and said front end; and d) at least one passageway through which said first annular groove communicates with said second annular groove.

2. The core tube of claim 1 wherein said passageway comprises at least one groove in said external surface extending between and communicating with each of said first and second annular grooves.

3. The core tube of claim 1 wherein said passageway comprises a pair of intermediate grooves respectively extending between said opposite ends of said first annular groove and said second annular groove.

4. The core tube of claim 3 wherein said intermediate grooves have axial centerlines substantially parallel to said longitudinal axis and spaced substantially 180° from one another about the periphery of said hollow member.

5. The core tube of claim 1 wherein said external surface portions lie in a uniformly tapered, conical plane.

6. The core tube of claim 5 wherein said external surface portions lie entirely between said second annular groove and said rear end.

7. The core tube of claim 6 wherein said hollow member includes a forward portion having an external surface lying entirely between said second annular groove and said front end and entirely within said conical plane.

8. Cross head die apparatus for applying a uniform layer of flowable coating material to a filamentary member as the latter is moved longitudinally through a die orifice at the front end of said apparatus, said apparatus comprising:

a) a body member having an axial bore extending between forward and rear ends of said body and a radial bore extending into one side of said body to communicate with said axial bore at a predetermined position intermediate of said forward and rear ends, said axial and radial bores having respective first and second central axes;

b) a core tube having:

i) a third central axis extending between front and back ends of said core tube;

ii) first external surface portions configured for mating engagement with correspondingly configured, internal surface portions of said axial bore to position said core tube in predetermined axial and rotational orientation with respect to said body;

iii) a first annular groove extending between opposite ends partially around said core tube, the mid-point between said opposite ends being intersected by said second axis;

iv) a second annular groove extending 360° around said core tube, said second annular groove being axially separated from said first annular groove and positioned between said first annular groove and said core tube front end;

v) a pair of intermediate grooves respectively communicating with said opposite ends of said first annular groove, and each communicating with said second annular groove, said first annular groove and said intermediate grooves being bounded on all sides by mating portions of said core tube and axial bore surfaces, whereby coating material injected through said radial bore flows into and around said first annular groove and through said intermediate grooves into and around said second annular groove; and c) flow passage means confining flow of said coating material to an annular path between said second annular groove and said die orifice.

9. The apparatus of claim 8 wherein said first and third central axes are substantially coaxial.

10. The apparatus of claim 8 wherein said intermediate grooves extend between said first and second annular grooves along linear axes substantially parallel with said third axis.

11. The apparatus of claim 9 wherein said linear axes are spaced substantially 180° apart around said core tube, each being spaced substantially 90° from said predetermined position.

12. The apparatus of claim 8 wherein the width of said first annular groove is enlarged on both of said forward and rear sides of the intersection therewith of said second axis, said first annular groove otherwise being of substantially constant width between said opposite ends.

13. The apparatus of claim 8 wherein a portion of said flow passage means comprise second external surface portions of said core tube positioned between said second annular groove and said front end.

14. The apparatus of claim 13 wherein said second annular groove and said second external surface portions meet at a circular lip which is spaced from a surrounding portion of said body axial bore.

15. The apparatus of claim 14 and further including a plurality of axial grooves extending from said second annular groove through said lip.

16. The apparatus of claim 15 wherein two of said axial grooves are spaced substantially 180° from one another around said lip, each of said axial grooves being spaced substantially 90° from the axial mid-points of said intermediate grooves.

17. A core tube for positioning in cross-head die apparatus, said core tube comprising a one-piece body having:

a) a central axis extending between front and rear ends;

b) a generally frustoconical, external surface;

c) a first annular groove extending into and partially around said external surface between opposite ends;

d) a second annular groove extending into and fully around said external surface at a position axially spaced from said first annular groove and between the latter and said front end; and e) a pair of intermediate grooves extending into said external surface and respectively from said opposite ends of said first annular groove to said second annular groove, whereby said first and second annular grooves communicate through said intermediate grooves.

18. The core tube of claim 17 wherein all cross sections of said first and second annular grooves normal to said central axis lie in spaced, parallel planes.

19. The core tube of claim 17 wherein said intermediate grooves extend along respective axes which are substantially parallel to said central axis.

20. The core tube of claim 19 wherein said respective axes are positioned substantially 180° apart around said core tube.

21. The core tube of claim 17 wherein said external surface includes first surface portions by which said first annular groove and said intermediate grooves are bounded on all sides, said first surface portions lying on a uniformly tapering, conical plane.

22. The core tube of claim 21 wherein said external surface further includes second surface portions extending between said second annular groove and said front end, said second surface portions lying entirely within said conical plane.

23. The core tube of claim 22 wherein said second annular groove borders said second surface portions at a substantially circular lip lying entirely within said conical plane.

24. The core tube of claim 23 wherein said second surface portions lie on a second conical plane.

25. The core tube of claim 23 and further including at least one axial groove extending through said lip between said second annular groove and said second surface portions.

* * * * *